Figure 1:
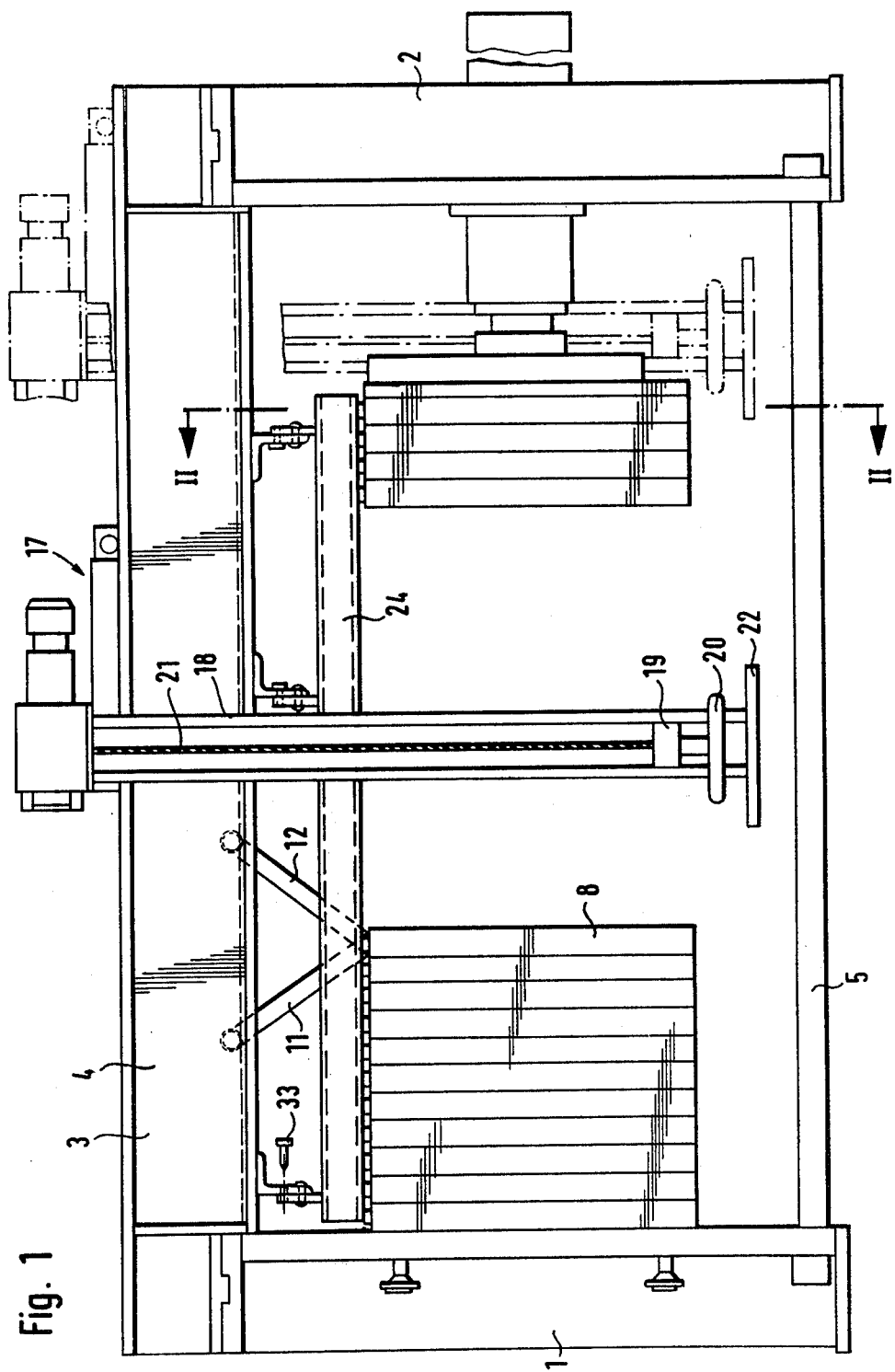

United States Patent [19]

Rademacher et al.

[11] 4,351,725
[45] Sep. 28, 1982

[54] PLATE FILTER PRESS WITH STOP RAILS FOR PLATE GUIDANCE

[75] Inventors: Karl A. Rademacher, Wuppertal; Max Oelbermann, Remscheid, both of Fed. Rep. of Germany

[73] Assignee: Rittershaus & Blecher GmbH, Wuppertal, Fed. Rep. of Germany

[21] Appl. No.: 229,836

[22] Filed: Jan. 30, 1981

[30] Foreign Application Priority Data

Jan. 30, 1980 [DE] Fed. Rep. of Germany ... 8002233[U]

[51] Int. Cl.³ ............................................. B01D 25/12
[52] U.S. Cl. ..................................... 210/230; 210/231
[58] Field of Search ................. 210/225, 230, 231, 236

[56] References Cited

U.S. PATENT DOCUMENTS

| | | | |
|---|---|---|---|
| 236,132 | 12/1880 | Wilcox et al. | 210/236 X |
| 4,076,033 | 2/1978 | Busse et al. | 134/172 |
| 4,105,559 | 8/1979 | Busse et al. | 210/225 |
| 4,172,792 | 10/1979 | Heinaich et al. | 210/230 |
| 4,229,303 | 10/1980 | Heinaich et al. | 210/230 X |

Primary Examiner—John Adee
Attorney, Agent, or Firm—Antonelli, Terry & Wands

[57] ABSTRACT

In a plate filter press with filter plates (8) suspended on support guides (3, 4), which filter plates are guided along stop rails (23, 24) for the purpose of preventing pendulating oscillations, the oscillation protection is to be constructed so that a required filter plate replacement or filter cloth exchange can be carried out without disassembly of the oscillation protection.

For this purpose, the provision is made that the stop rails (23, 24) can be operatively adjusted away from the filter plates (8), and to attain this objective, the stop rails are preferably pivotable about axles (30, 31) extending in parallel to the longitudinal axis of the filter press.

21 Claims, 8 Drawing Figures

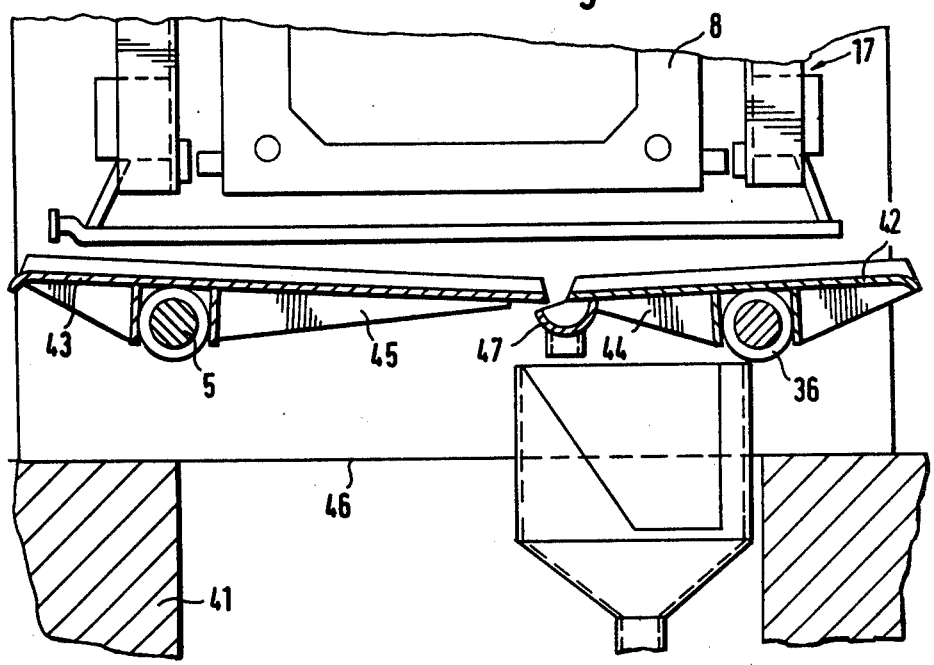
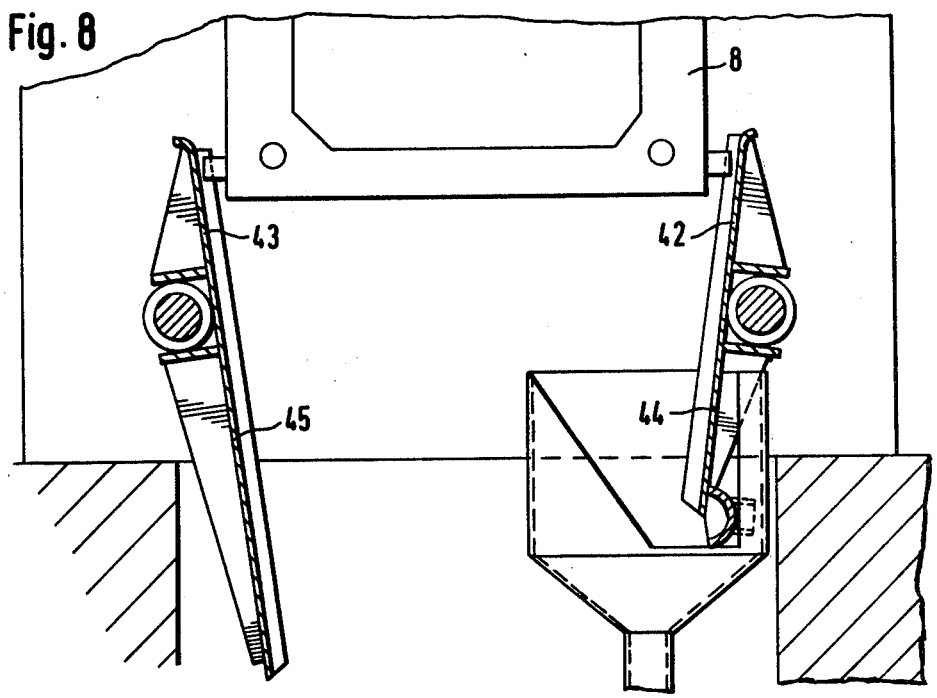

PLATE FILTER PRESS WITH STOP RAILS FOR PLATE GUIDANCE

The invention relates to a plate filter press with filter plates suspended on support guides, which filter plates are guided along stop rails for the purpose of preventing pendulating oscillations.

Large-size plate filter presses are equipped with guide bars or stop rails to limit the pendulating movement of the filter plates during the moving apart of the filter plate pack. However, these conventional guide elements represent, even if designed as stop rails, still a considerable impediment in the operations connected with the exchanging of a filter cloth or a filter plate.

The invention is based on the problem of constructing the oscillation protection of the filter plates in such a way that a necessary filter plate exchange or filter cloth replacement can be effected without disassembly of the oscillation protection.

This problem has been solved in accordance with the invention by providing that the stop rails can be adjusted away from the filter plates. The invention preferably provides, in this connection, that the stop rails are pivotable about axles extending in parallel to the longitudinal axis of the filter press. By means of these measures, it is now possible, during a necessary filter plate exchange or the like, to operatively adjust the oscillation protection stop rails, with maximally simple manipulations, away from the filter plates for such a distance that the plate track rollers or plate sliding blocks can, for example, be lifted out of their tracks or so that a filter cloth replacement can be effected even while the plate is still suspended.

In relatively large plate filter presses, the provision can be made according to the invention that each stop rail is subdivided into independently pivotable individual sections.

According to one embodiment, the provision can be made according to this invention that the stop rails are supported at the upper support guide and can be brought into contact with the upper narrow side of the plate or with the narrow outer sides of the filter plates. In a specific construction, the support guides are equipped with bearing plates oriented downwardly and the stop rails are provided with bearing plates oriented upwardly, these bearing plates being articulated together by a pivotable axle and being arrestable in the operating position or in a retracted position by means of pins which can be inserted in detent bores. This embodiment is distinguished by a very convenient operability and at the same time an economical manufacture.

According to an alternative embodiment, the provision can be made according to the invention that the stop rails are located at the lower corner zones of the filter plates. In this connection, the stop rails are suitably mounted to be pivotable on the lower tie rods of the filter press, since the tie rods, which are present anyway in relatively large filter presses, can be utilized in this way as a pivot axle. Advantageously, the stop rails consist of an L-shaped profile plate wherein bearing bushes surrounding the tie rods are attached in the angular zone of this plate; with their longer leg, reinforced by ribs, the stop rails can be brought into engagement with the narrow outer sides of the filter plate.

The pivotability of the stop rails, as provided for in accordance with the invention, proves to be especially advantageous in plate filter presses with a frame-like plate spray-washing device movable over the filter plate pack. In this case, the stop rails can be arranged, on the one hand, at the lower end zone of the filter plates which is of special advantage in view of their guidance task since they are remote from the filter plate suspension unit. However, on the other hand, it is also possible to make room for a free passage of the spray-washing device by pivoting the stop rails away into a downwardly swung position. In this connection, the frame of the spray-washing device is suitably equipped with abutments to prevent the pendulating movement of a plate which is being spray-washed.

According to other features of the invention, the provision can be made that the stop rails are extended past the tie rods to cover plates for bin [hopper] openings, these cover plates overlapping in the reclining position and, in the operating position of the stop rails diverging upwardly in the manner of funnel walls. These stop rails, extended as cover plates, serve during normal operation of the plate filter press on the one hand for guiding the filter plates and on the other hand as baffles during ejection of the filter cake into a bin arranged underneath the filter press. During washing of the filter plates, the extended stop rails serve as catches for spray water and as a cover for the bin opening. Suitably, the overlapped cover plate is provided with a water drain channel at its lower edge in this construction.

Figure 2:
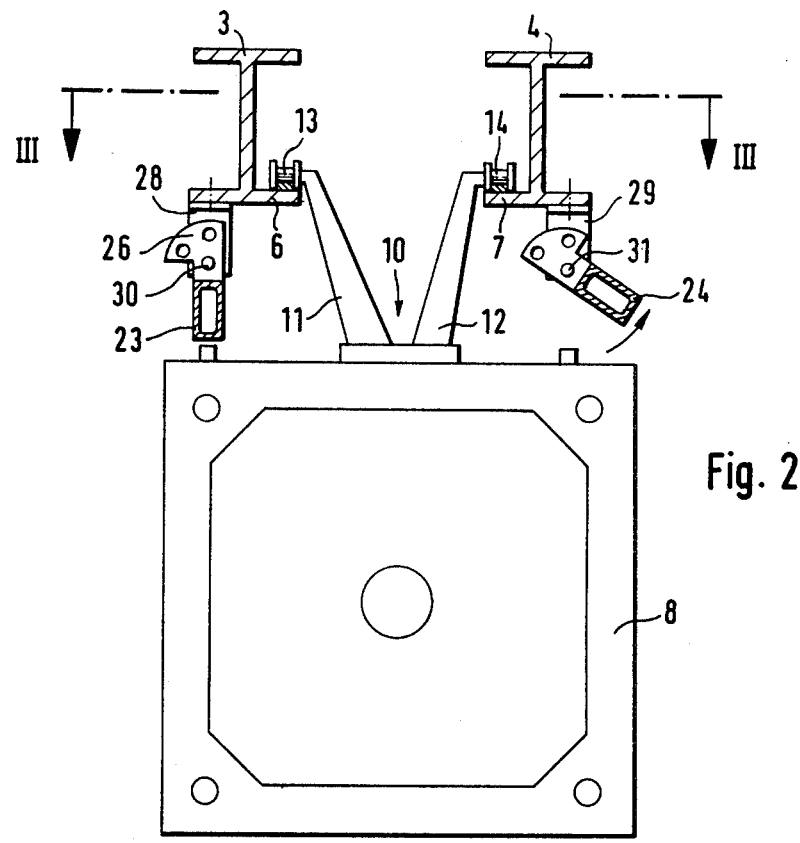
Figure 3:
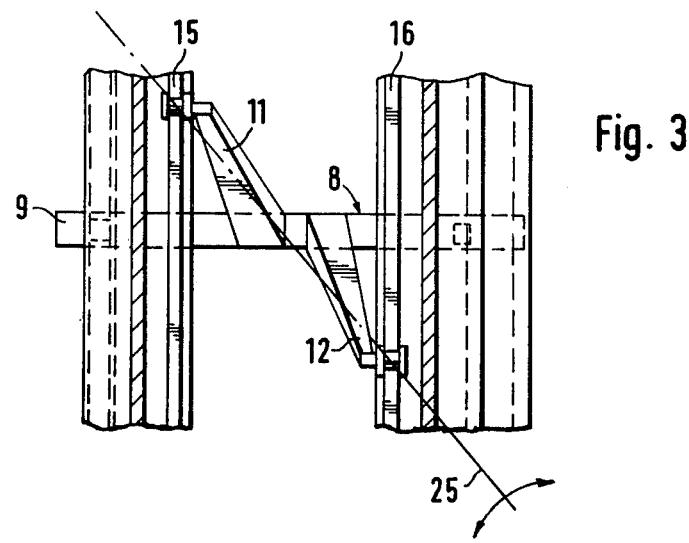
Figure 4:
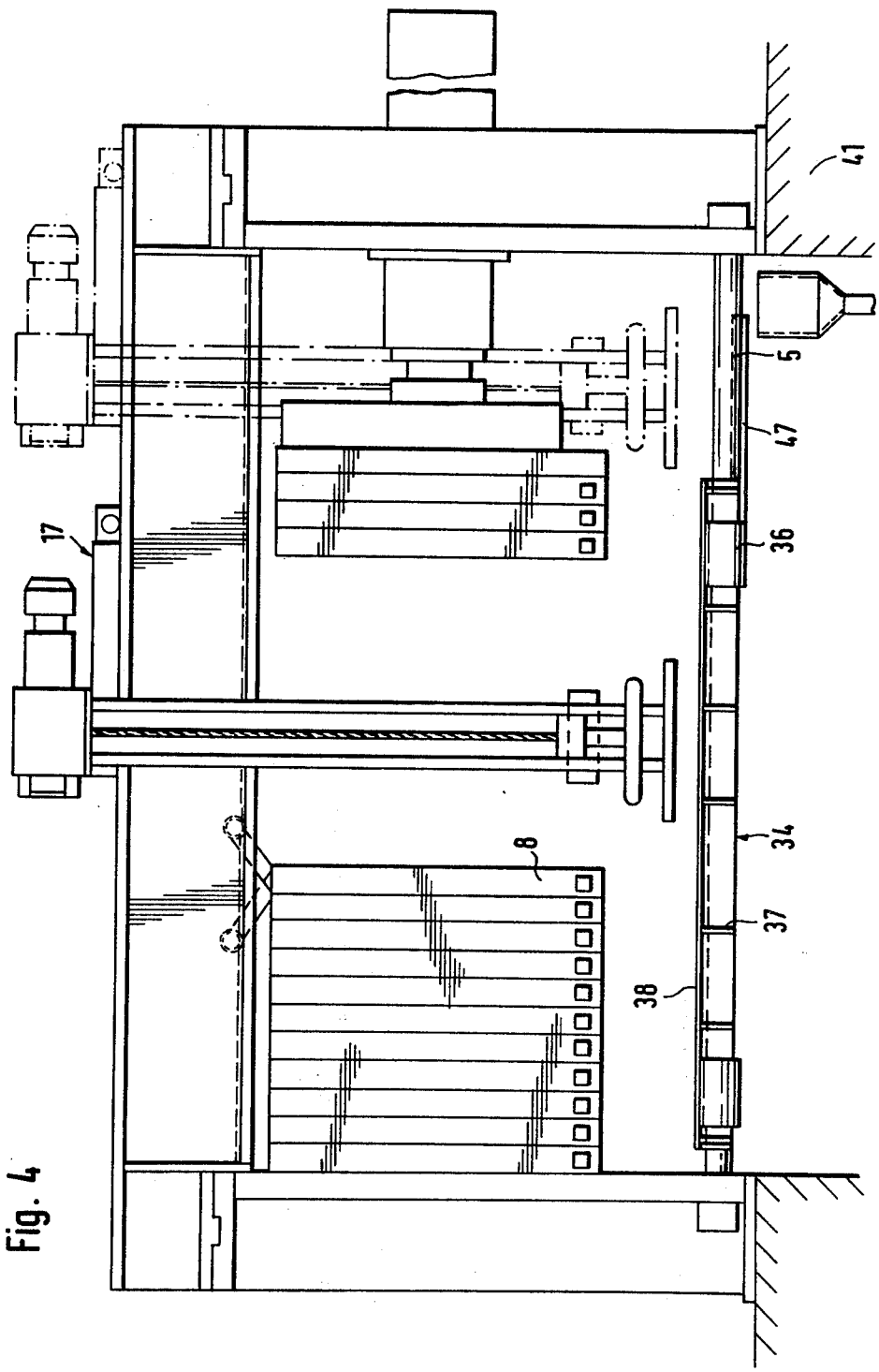
Figure 5:
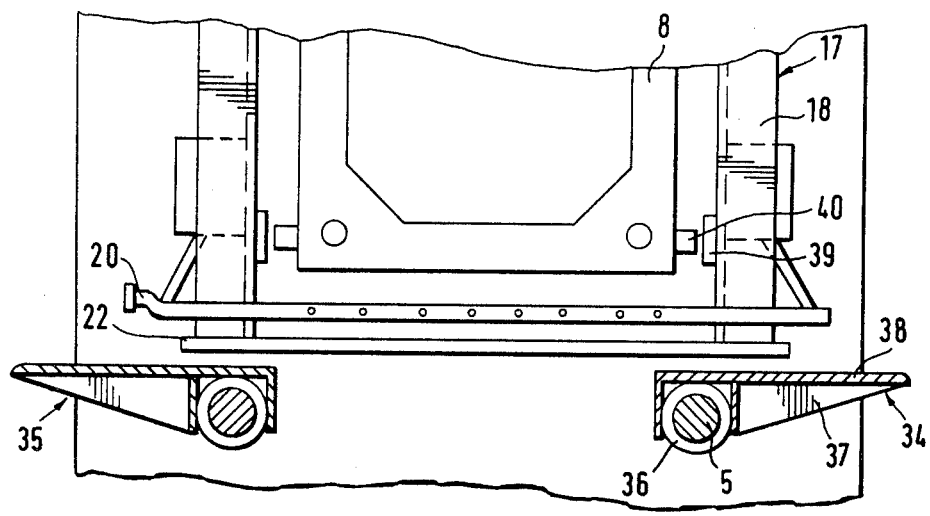
Figure 6:
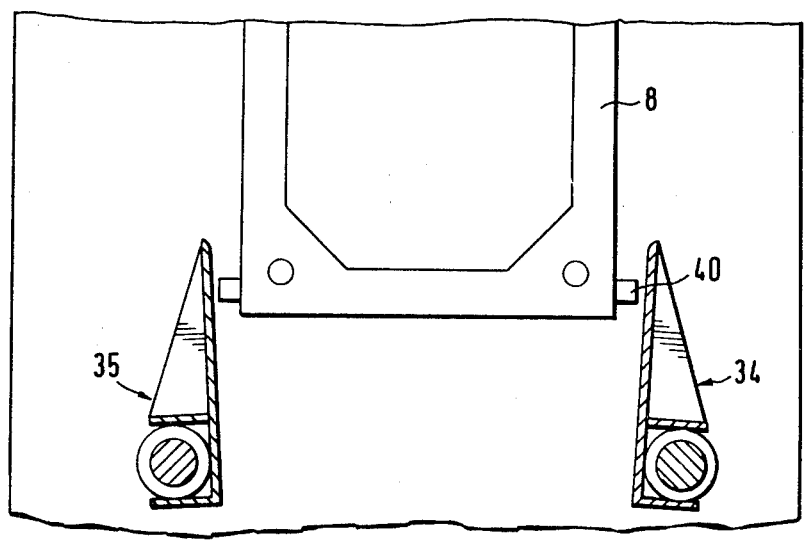

The invention will be described in greater detail below with reference to several embodiments illustrated in the drawing wherein:

FIG. 1 shows a filter press in a lateral view with oscillation-protecting stop rails arranged at the topside of the filter plate, FIG. 2 shows a partial cross section through the filter press of FIG. 1, FIG. 3 shows a section along line III—III of FIG. 2, FIG. 4 shows in a lateral view a second embodiment of a filter press with oscillation-protecting stop rails arranged in the lower zone of the filter plates, FIG. 5 shows a detail in a cross section through the filter press according to FIG. 4, FIG. 6 shows, in a detailed view, the stop rails in contact position with the filter plate pack, FIG. 7 shows, in a detailed view, a third embodiment of the filter press wherein the stop rails are shown in the retracted position, and FIG. 8 shows the filter press according to FIG. 7 with stop rails in contact position with the filter plate pack.

FIGS. 1–3 illustrate a plate filter press with two vertical posts 1, 2, on which rest two parallel I-shaped support guides 3, 4 arranged at a mutual spacing; at the bottom, the posts are joined by two parallel tie rods 5. A plurality of filter plates 8 is displaceably suspended on the lower, inner flanges 6, 7 of the two I-shaped support guides 3, 4. The filter plates exhibit at their upper, narrow side 9 a central suspension 10 with support arms 11, 12 angled in opposite directions. Track rollers or sliding blocks 13, 14 are disposed at the free ends of the support arms 11, 12 and rest via tracks 15, 16 on the I-flanges 6, 7.

A plate spray-washing device 17 is arranged movably on the upper flanges of the I-shaped support guides 3, 4. The spray-washing device 17 exhibits a rectangular supporting frame surrounding the two support guides 3, 4 and the filter plates 8. The lateral spars 18 of this frame exhibit an outwardly open C-profile, and mounting means 19 for a spray pipe 20, which latter can be moved up and down, are guided in these lateral spars. The spray pipe 20 exhibits two branch conduits encompassing between them a filter plate 8 to be washed; these branch conduits are equipped with spray nozzles pointed toward each other so that a filter plate to be cleaned is simultaneously sprayed off on both of its major surfaces. The mounting means 19, fashioned as weights, are each suspended on cables 21 which are wound up to move the spray pipe 20 upwardly. The lower transverse spar of the rectangular frame of the spray-washing device is constituted by a collecting trough 22.

The filter plates are normally guided along their uppe narrow sides on stop rails 23, 24 which prevent a pendulating movement around the axis 25 indicated in dot-dash lines in FIG. 3. To exchange a filter plate, the stop rails 23, 24, however, can be swung away from the filter plates 8 as illustrated in FIGS. 2 and 3 respectively on the right-hand side. The stop rails 23, 24, fashioned as rectangular pipes are provided with bearing plates 26, 27 on their upper narrow sides, these bearing plates being in contact with downwardly oriented bearing plates 28, 29 of the support guides 3, 4. The bearing plates are articulated together respectively in pairs by means of a pivot-bearing axle 30, 31, and can be fixed in the operating position (left-hand side of FIG. 2) and/or in the retracted position (right-hand side of FIG. 2) by pins 33 which can be inserted in detent bores 32. In the retracted position according to FIG. 2, right-hand side, the stop rail 24, however, still remains almost entirely in the vertical alignment with the filter plate, so that the frame-like spray-washing device 17 can still be moved along the filter plate pack even when the stop rails 23, 24 have been pivoted upwardly.

In the embodiment of FIGS. 4, 5, and 6, as contrasted to the previously described embodiment, the oscillation-protecting stop rails 34, 35 are arranged at the lower corner zones of the filter plates 8 and are respectively pivotably supported on the lower tie rods 5. The stop rails consist of an L-shaped profile plate; bearing bushes 36 are attached in the angular zone of this plate, these bearing bushes surrounding the tie rods. With their longer leg 38, reinforced by ribs 37, these stop rails can be brought into contact with the narrow outer sides of the filter plates 8 (see FIG. 5).

In the downwardly pivoted position according to FIGS. 4 and 5, the stop rails 34, 35 are located at such a wide spacing from the filter plates 8 that the frame-like spray-washing device 17 with its lower trough 22 and the spray pipe 20, located in the lower position, can be freely passed through between the filter plate pack and the stop rails. The frame-like spray-washing device carries at the two lateral parts respectively short abutment members 39 which are aligned with counter stops 40 at the narrow sides of the filter plates and which protect filter plates respectively in the spraying-off position against pendulating means.

FIGS. 7 and 8 illustrate a vary advantageous further development of the filter press according to the embodiment of FIGS. 4–6. The filter press is arranged in FIGS. 7 and 8 above a bin 41 for accommodating the filter cake. In such a setup of the filter press, the spray water must be collected and discharged during the spray-washing of a filter plate. In the embodiment according to FIGS. 7 and 8, the stop rails 42, 43 are extended past the tie rods 5 to cover plates 44, 45 for the bin opening 46. The cover plates overlap each other in the reclined position, wherein the overlapped cover plate 44 is provided at its lower rim with a water drainage channel 47.

In the normal operating position according to FIG. 8, the stop rails 42, 43 are pivoted upwardly and are in contact with the counter stops 40 of the filter plates 8 so that they serve as protection against pendulating oscillations. The stop walls 42, 43 represent, together with the cover plates 44, 45, funnel walls extending into the bin opening 46, these walls centering the ejection of the filter cake toward the bin opening.

The invention is not limited to the illustrated embodiments. In large filter presses, it is always advantageous to subdivide the stop rails into separably pivotable individual sections in order to keep the required adjusting force at a minimum in this way.

We claim:

1. Plate filter press comprising a plurality of filter plates, each of which is centrally suspended on support guide means for horizontal displacement on a path therealong, and stop rail means positioned parallel to said horizontal displacement path for preventing pendulating oscillations of the filter plates, said stop rail means being mounted for displacement between a first, filter plate guiding, position adjacent the filter plates and a second, non-guiding position, displaced from the filter plates, wherein filter replacement is facilitated.

2. Plate filter press according to claim 1, characterized in that the stop rail means comprise stop rails (23, 24) which are pivotable about axles extending in parallel to a longitudinal axis of the filter press.

3. Plate filter press according to claim 2, characterized in that each stop rail is subdivided into independently pivotable sections.

4. Plate filter press according to claims 1, or 2, or 3, characterized in that the stop rail means (23, 24) are supported at upper support guides (3, 4) of the support guide means and are adjustable into contact with at least one narrow side (9) of each of the filter plates (8).

5. Plate filter press according to claim 4, characterized in that the support guides (3, 4) are equipped with downwardly oriented bearing plates and the stop rail means (23, 24) are equipped with upwardly oriented bearing plates (26, 27, 28, 29), which are articulated to each other by a pivot-bearing axle (30, 31) and can be arrested in at least one of an operative position and a retracted position by means of pins (33) insertable in detent bores (32).

6. Plate filter press according to claims 1 or 2 or 3, characterized in that the stop rail means (34, 35) are arranged at lower corner zones of the filter plates (8).

7. Plate filter press according to claim 6, characterized in that the stop rails (34, 35) are pivotably supported on lower tie rods (5) of the filter press.

8. Plate filter press according to claim 7, characterized in that the stop rail means (34, 35) comprises a plurality of plates, each plate having an L-profile, bearing brushes (36) being arranged in an angular space of said plates and surrounding the tie rods (5), said stop rail means being arranged so as to be contactable with narrow outer sides of the filter plates (8) with a longer leg thereof (38) that is reinforced by ribs (37).

9. Plate filter press according to claim 7, with a frame-like spray-washing device movable over the filter plates, characterized in that the stop rail means (34, 35) lie, in a downwardly swung position, at a spacing from the filter plates (8) sufficient for the passage of the spray-washing device (17); and that a frame of the spray-washing device is provided with abutments (39)

to prevent a pendulating motion of a plate to be spray-washed.

10. Plate filter press according to claim 9, characterized in that the stop rail means (42, 43) are extended past the tie rods (5) as cover plates (44, 45) for a bin opening (46), said cover plates, in a reclining position, overlapping each other, and, in an operative position, diverging upwardly in the manner of funnel walls.

11. Plate filter press according to claim 10, characterized in that the cover plate overlapped in said reclining position (44) is equipped with a water drainage channel (47) at its lower rim.

12. Plate filter press according to claim 6, with a frame-like plate spray-washing device movable over the filter plates, characterized in that the stop rail means (34, 35) lie, in a downwardly swung position, at a spacing from the filter plates (8) sufficient for the passage of the spray-washing device (17); and that a frame of the spray-washing device is provided with abutments (39) to prevent a pendulating motion of a plate to be spray-washed.

13. Plate filter press according to claim 12, characterized in that the stop rail means (42, 43) are extended past the tie rods (5) as cover plates (44, 45) for a bin opening (46), said cover plates, in a reclining position, overlapping each other and, in an operative position, diverging upwardly in the manner of funnel walls.

14. Plate filter press according to claim 13, characterized in that the cover plate overlapped in said reclining position (44) is equipped with a water drainage channel (47) at its lower rim.

15. Plate filter press according to claim 8, with a frame-like plate spray-washing device movable over the filter plates, characterized in that the stop rail means (34, 35) lie, in a downwardly swung position, at a spacing from the filter plates (8) sufficient for the passage of the spray-washing device (17); and that a frame of the spray-washing device is provided with abutments (39) to prevent a pendulating motion of a plate to be spray-washed.

16. Plate filter press according to claim 15, characterized in that the stop rail means (42, 43) are extended past the tie rods (5) as cover plates (44, 45) for a bin opening (46), said cover plates, in a reclining position, overlapping each other and, in an operative position, diverging upwardly in the manner of funnel walls.

17. Plate filter press according to claim 16, characterized in that the cover plate overlapped in said reclining position (44) is equipped with a water drainage channel (47) at its lower rim.

18. Plate filter press according to claim 1, characterized in that each stop rail means is subdivided into independently pivotable stop rail sections.

19. Plate filter press according to claim 4, wherein said narrow side is an upper side of the filter plates.

20. Plate filter press according to claim 4, wherein said at least one narrow side comprises outer sides of the filter plates.

21. Plate filter press according to claim 1 wherein said filter plates are individually displaceable along said path relative to said guide rail means in guided relationship thereto.

* * * * *